United States Patent [19]
Headlee

[11] Patent Number: 5,895,066
[45] Date of Patent: Apr. 20, 1999

[54] BOAT TRAILER

[76] Inventor: Arthur W. Headlee, 1713 SW. Vickie Ter., Stuart, Fla. 34997

[21] Appl. No.: 08/721,694

[22] Filed: Sep. 26, 1996

[51] Int. Cl.$^6$ ..................................................... B60P 3/10
[52] U.S. Cl. ................... 280/414.1; 280/482; 280/491.5
[58] Field of Search ........................... 280/414.1, 478.1, 280/482, 491.1, 491.2, 491.5; 114/344

[56] References Cited

U.S. PATENT DOCUMENTS

| | | | |
|---|---|---|---|
| 2,591,312 | 4/1952 | Stees | 280/482 |
| 2,713,951 | 7/1955 | Davies | 280/414.1 |
| 2,944,835 | 7/1960 | Englehardt et al. | 280/482 |
| 3,032,353 | 1/1962 | Williams et al. | 280/414 |
| 3,083,986 | 4/1963 | Moody et al. | 280/414 |
| 3,142,494 | 7/1964 | Kelley | 280/414 |
| 3,326,573 | 6/1967 | Neitzey, Jr. | 280/482 |
| 3,428,336 | 2/1969 | Thurman | 280/482 |
| 3,738,684 | 6/1973 | Lusk | 280/491 |
| 3,989,266 | 11/1976 | Foster | 280/414 |
| 4,046,274 | 9/1977 | Libersky | 280/482 |
| 4,169,611 | 10/1979 | Smith et al. | 280/482 |
| 4,232,990 | 11/1980 | Pierce | 414/559 |
| 4,331,346 | 5/1982 | Walters | 280/414 |
| 4,623,161 | 11/1986 | Sprague | 280/414 |
| 4,726,601 | 2/1988 | Stevens | 280/482 |
| 5,011,177 | 4/1991 | Grice | 280/482 |

*Primary Examiner*—Anne Marie Boehler
*Attorney, Agent, or Firm*—William M. Hobby, III

[57] ABSTRACT

A boat trailer has an extendible tongue and includes a trailer body along with a tongue having a hitch attachment on one end thereof for removably attaching the tongue to a vehicle. A telescoping tongue is fixedly attached to the boat trailer body and has a pair of roller brackets attached thereto for telescoping the tongue. Each roller bracket is movably attached to the tongue for rolling engagement therewith. A latching mechanism is attached to the tongue for removably locking the tongue to one of the roller brackets on the telescoping tongue to thereby latch the tongue to the telescoping tongue to prevent the telescoping tongue and trailer body from moving relative to the tongue when in a latched position and to allow the telescoping tongue and trailer body to telescope relative to the tongue when the latching mechanism is unlatched from the roller bracket. The latching mechanism has a spring loaded latching arm having a catch for engaging and locking dog on one bracket and has a lever release arm coupled to the latching arm to release the latch arm from the dog to thereby allow the telescoping tongue to telescope relative to the tongue.

6 Claims, 6 Drawing Sheets

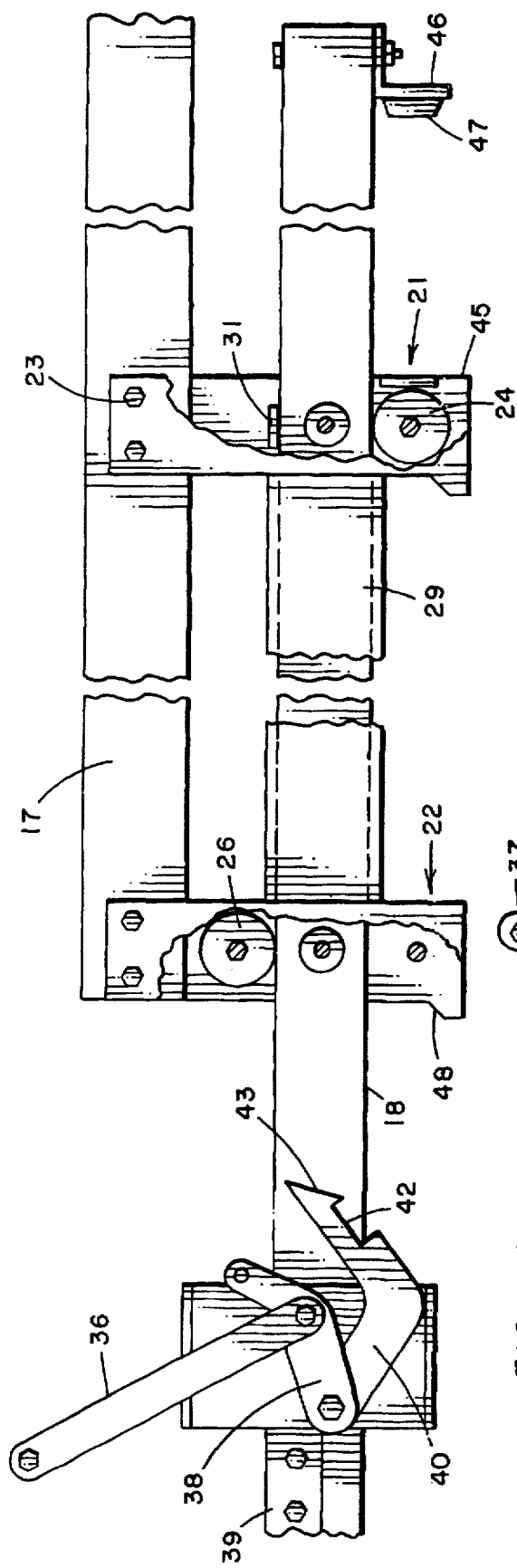
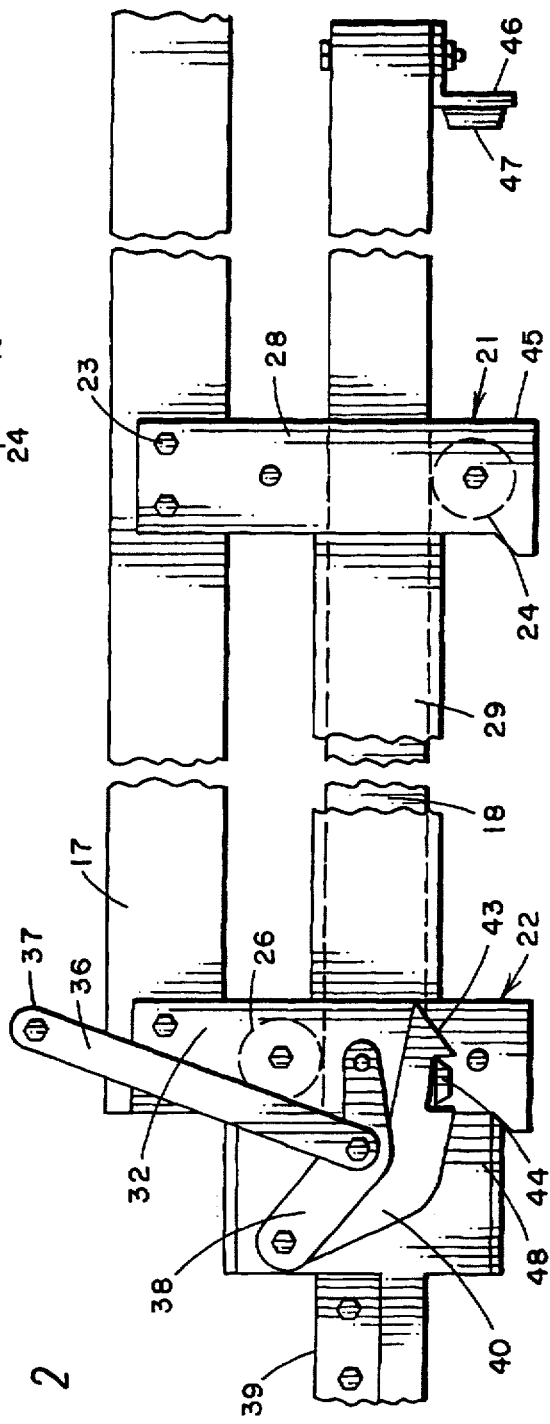
FIG. 2
FIG. 3

5,895,066

BOAT TRAILER

BACKGROUND OF THE INVENTION

The present invention relates to a boat trailer and especially to a boat trailer having an extending tongue mechanism for use in launching or loading a boat onto the boat trailer.

As any boat enthusiast knows who trails his boat to a ramp or shore for launching, there are severe limitations to the conventional boat trailers which prevent the enthusiast from launching or retrieving his boat in shallow water or at low tide or in the event that his boat has a deep keel, such as, for example, in the case of sailboats which are provided with relatively deep fixed keels. While these adverse conditions are not always present when the boater wishes to enjoy the pleasures afforded by boating or sailing, they nevertheless may limit his full use of his or her boat.

There have been attempts in the prior art to minimize the loss of full use of boats for the operator by arranging boat trailer tongues with extension devices which permit the operator to elongate the tongue so that the vehicle towing the trailer need not drive his vehicle too close to or into the water's edge, and yet be able to move the trailer further out into the water thereby avoiding inadvertent scraping of the bottom of the launch site by his boat keel.

Another disadvantage with some of the conventional tongue and extension mechanisms is that these extensions are integrated into and are a part of the tongue itself, and thereby become too expensive for the average boater. These arrangements require that those boaters who presently own and operate conventional boat trailers must discard their boat trailer and purchase a new one in the event that they need the same only occasionally. In any event, the trailers of the prior art require an expensive apparatus that is not necessarily utilized for all boating opportunities.

Prior art boat trailer structures include an extension device in U.S. Pat. No. 4,169,611 to Smith et al. which is a dedicated piece of structure which is integrally incorporated into the boat trailer tongue. The same disadvantage is also generally found with the trailer hitch arrangement disclosed in U.S. Pat. No. 3,326,573 to Neitzey, Jr.

Examples of other telescoping trailers may be seen in the U.S. patents to Englehardt et al., U.S. Pat. No. 2,944,835; and to Neitzey, Jr., U.S. Pat. No. 3,326,573; and in the prior art patent to Kelley, U.S. Pat. No. 3,142,494; and in the patents to Lusk, U.S. Pat. No. 3,738,684; and Williams, et al., U.S. Pat. No. 3,032,353; and Moody, et al., U.S. Pat. No. 3,083,986; and Thurman, U.S. Pat. No. 3,428,336; and Walters, U.S. Pat. No. 4,331,346; and Sprague, U.S. Pat. No. 4,623,161; and Pierce, U.S. Pat. No. 4,232,990; and Foster, U.S. Pat. No. 3,989,266; and Grice, U.S. Pat. No. 5,011,177.

The present invention distinguishes from these prior patents by being a boat trailer having an extending tongue which is easily added to or adapted to an existing boat trailer which simplifies the locking and unlocking of the telescoping arm which telescopes on roller brackets having two boat tongues, one extending relative to the other in parallel fashion.

SUMMARY OF THE INVENTION

A boat trailer has an extendible tongue and includes a trailer body along with a vehicle attaching tongue having a hitch attachment on one end thereof for removably attaching the tongue to the vehicle. A telescoping tongue is fixedly attached to the boat trailer body and has a pair of roller brackets attached thereto for telescoping the tongue. The roller brackets may be connected together with a tube slidably mounted over the tongue. Each roller bracket is also movably attached to the tongue for rolling engagement therewith. A latching mechanism is attached to the tongue for removably locking the tongue to one of the roller brackets on the telescoping tongue to thereby latch the tongue to the telescoping tongue to prevent the telescoping tongue and trailer body from moving relative to the tongue when in a latched position and to allow the telescoping tongue and trailer body to telescope relative to the tongue when the latching mechanism is unlatched from the front roller bracket. The latching mechanism has a latching arm having a catch for engaging and locking a latching dog on one bracket and has a lever release arm coupled to the latching arm to release the latch arm from the dog to thereby allow the telescoping tongue to telescope relative to the tongue.

BRIEF DESCRIPTION OF THE DRAWINGS

Other objects, features, and advantages of the present invention will be apparent from the written description and the drawings in which:

FIG. 2 is a side elevation of the latching and telescoping mechanism in accordance with the present invention;

FIG. 3 is a side elevation of the latching mechanism of FIG. 2 in a locked position;

DETAILED DESCRIPTION OF THE PREFERRED EMBODIMENT

Figure 1:
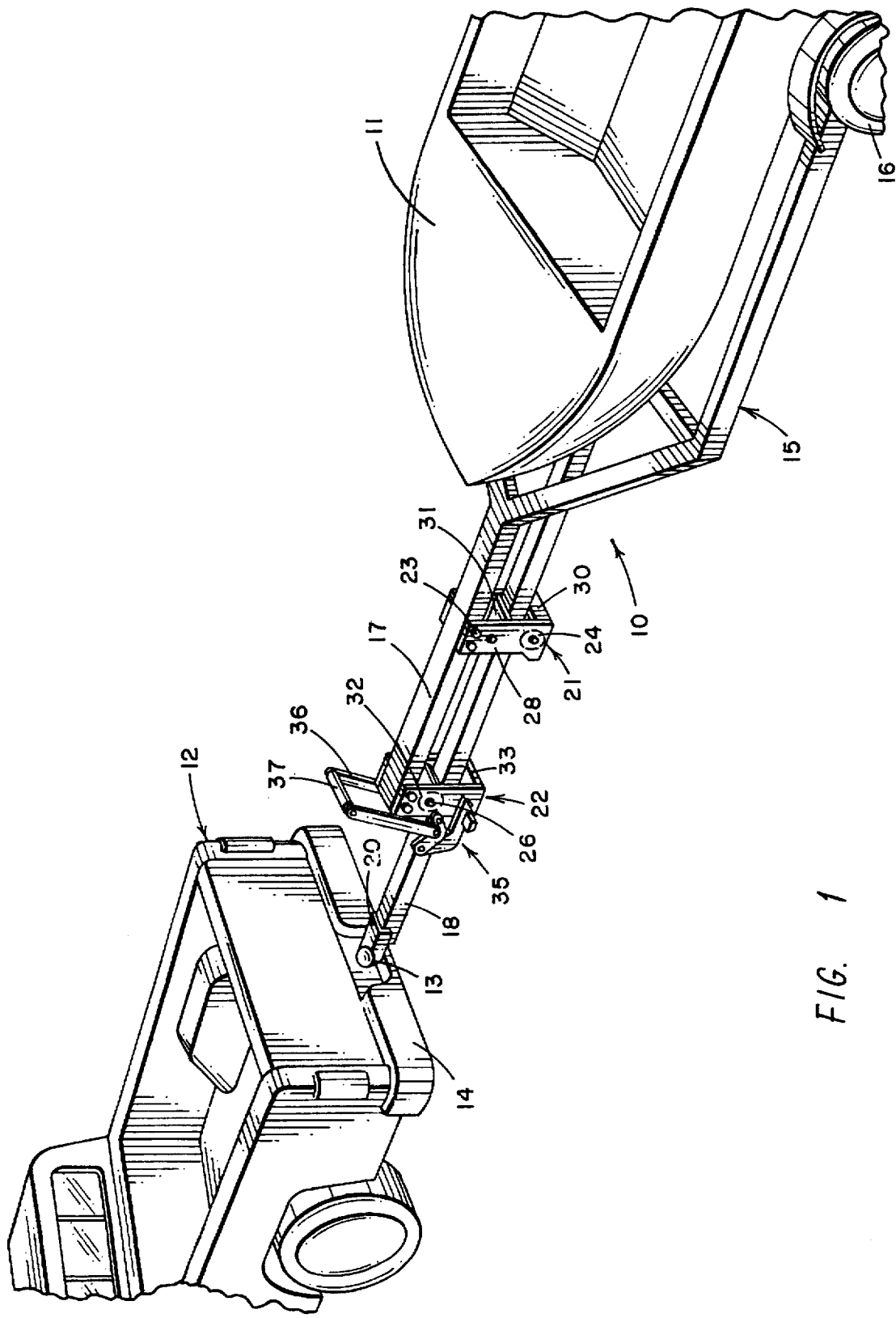
FIG. 1 is a perspective view of a boat trailer in accordance with the present invention having a boat thereon and connected to a pickup truck.

Referring to the drawings and especially to FIG. 1, is a boat trailer 10 in accordance with the present invention has a boat 11 supported thereon and is attached to a pickup truck 12 having a ball hitch 13 on the bumper 14. The trailer 10 has a boat trailer frame 15 having a pair of wheels 16 and has a protruding telescoping tongue 17 extending from the frame 15. A tongue 18 has a trailer hitch attaching portion 20 attached to the ball hitch 13 so as to be pulled by the pickup truck 12. The telescoping trailer tongue 17 has a rear roller bracket 21 and a front roller bracket 22 fixedly attached thereto with a plurality of bolts or rivets 23 but which could be fixedly attached thereto by welding. The telescoping tongue brackets 21 and 22 each extend around the tongue 18 and are slidably attached thereto with the rear bracket 22 having one or more rollers 24 positioned on the bottom 25 or beneath the tongue 18 while the bracket 22 has the roller 26 riding on the top 27 of the tongue 18. The bracket 21 is mounted around the tongue 18 by the side bracket members 28 and a bottom bracket member 30 having the roller attached thereabove and the top bracket member 31. The bracket 22 has a pair of side brackets 32 along with a bottom bracket member 33 and a top roller 26 so that the bracket 22 surrounds the tongue 18. The brackets 21 and 22 are connected by a square hollow tube 29 which also rides over the tongue 18.

The tongue 18 has a latching mechanism 35 fixedly attached thereto with the brace member 39 and has a latching release arm or lever 36 extending therefrom, as more clearly seen in FIGS. 2 and 3. The latching mechanism 35 has the arm 36 having a handle 37 and is attached to a link member 38 which in turn is attached to a latching arm 40. The latching mechanism 25 has a frame portion 41 fixedly attached to the tongue 18 while the latching arm 40 has a catch portion 42 and an angled end surface 43. Thus, moving the handle 36 from the position in FIG. 2 to that shown in FIG. 3 brings the latching arm 40 from an open position to a closed position in FIG. 3 where it latches onto a latching dog 44 attached to the front roller bracket 22 which in turn is fixedly attached to the telescoping tongue 17 to lock the telescoping tongue 17 to the tongue 18. Since the arm 36 in the position of FIG. 2 is swung to an overcenter position in FIG. 3 to rotate the toggle-like mechanism formed by the links 38 and 40, the latch is securely locked to lock the telescoping tongue 17 and tongue 18 together and allows for the easy release of the tongue by returning the handle 36 to the position of FIG. 2. This allows the telescoping tongue 17 to telescope on the tongue 18 with the rollers 24 and 26 rolling on the tongue 18 until the back edge 45 of the rear bracket 21 reaches a stop bracket 46 having a rubber stop 47 thereon to prevent the telescoping tongue 17 from extending off of the tongue 18 and to limit its travel.

In operation, the boat trailer frame 15 and tongue 17 can be rolled or slid forward on the tongue 18 until it abuts the bracket 35. The bracket is abutted with a wedging surface 48 which wedges against the bottom surface 50. A handle 36 is swung forward to lock the catch 42 onto the latching dog 44. With the trailer connected, as shown in FIG. 1, the boat 11 can be hauled on the trailer 10 to any desired location and can be backed up to a loading ramp. The handle 36 can then be pulled forward, as shown in FIG. 2, to unlatch the latch mechanism 42 from the dog 44 to allow the telescoping arm 17 to telescope on the tongue 18 with the roller brackets 21 and 22 sliding over the tongue 18 until the bracket 21 reaches the stop 46. The trailer would typically be in the water so that the boat can be slid off the trailer. The trailer frame 15 can be easily pulled forward and the tongue 17 locked to the tongue 18 with a latch mechanism 35 and the truck 12 driven to pull the trailer away from the loading ramp. An advantage of the present mechanism is that it can be attached to an existing boat trailer without having to make extensive modifications to the trailer and without requiring a custom manufactured trailer.

Figure 4:
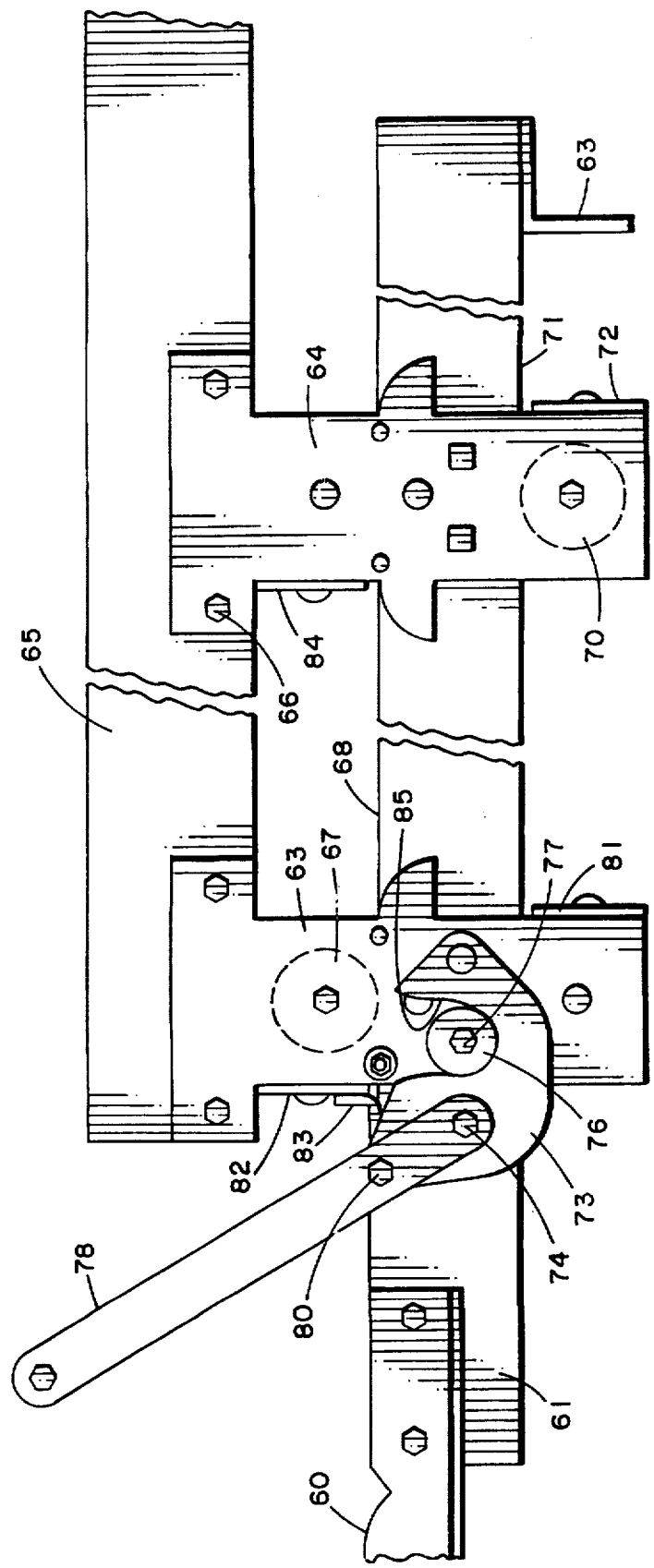
FIG. 4 is a side elevation of an alternate embodiment of a latching mechanism in a latched position.
Figure 5:
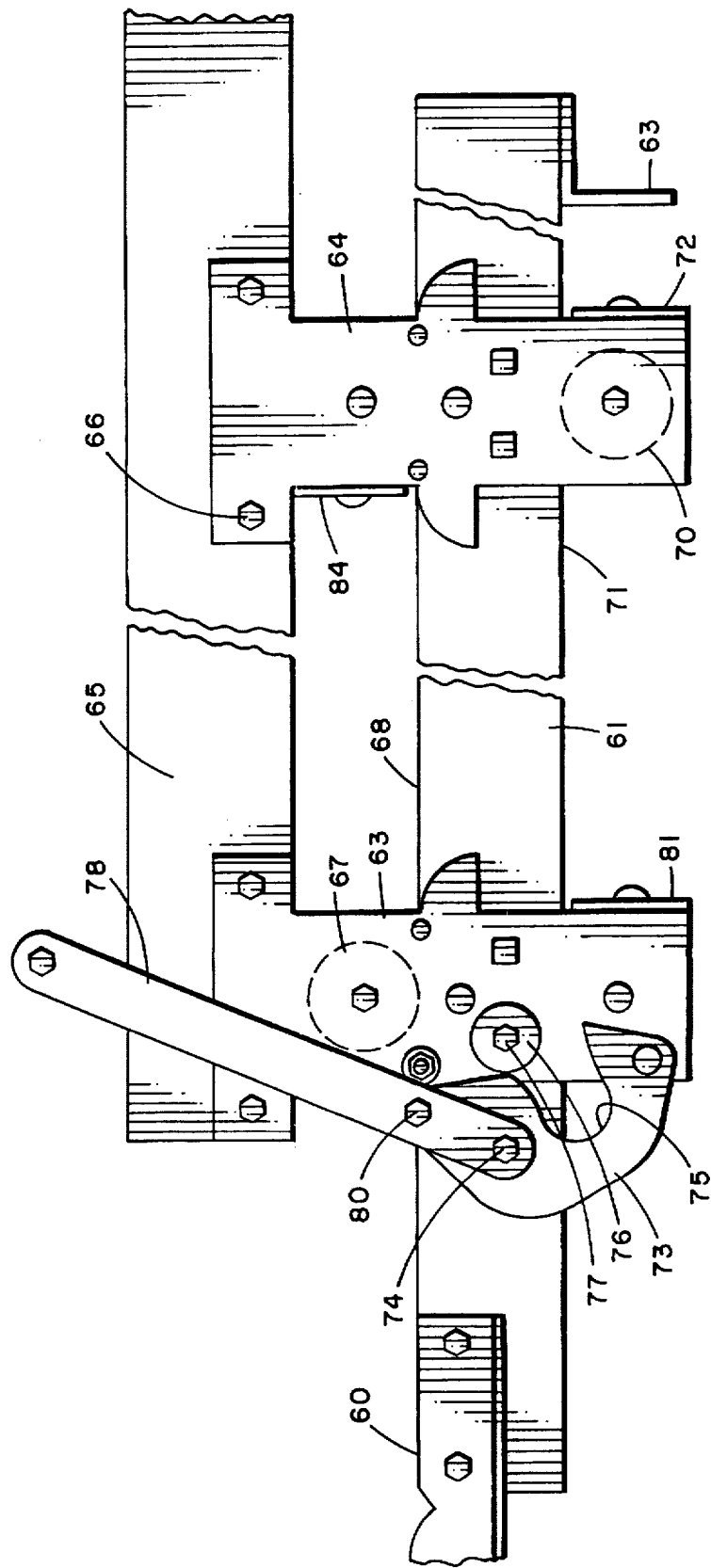
FIG. 5 is a side elevation of the embodiment of FIG. 4 in an unlatched position.

Turning now to FIGS. 4 and 5, an alternative embodiment of a boat trailer telescoping tongue is illustrated having a trailer hitch attaching portion 60 attached to a tongue 61. The tongue 61 has a stop member 62 attached thereto and has a front telescoping tongue bracket 63 and a rear telescoping tongue bracket 64 riding thereon. The brackets 63 and 64 each fixedly attach to the telescoping tongue 65 with bolts 66 but may be welded or attached in any manner desired. The front tongue bracket 63 has a roller 67 supported thereinside riding on the top surface 68 of the trailer tongue 61 while the rear bracket 64 has a roller 70 attached therein riding on the bottom surface 71 of the tongue 61 so that the brackets 63 and 64 slidably support the tongue 65 to the tongue 61 in a rolling fashion to allow the tongue 65 to be slid back or forth. The bracket 64 has a bumper member 72 attached thereto for abutting the stop member 62 to limit the travel to prevent the tongue 65 from coming loose from the tongue 61. In its most forward position, the tongue 65 is locked to the tongue 61 with the latching arm 73 which is pinned at 74 for rotation thereon and has an arcuate latching surface 75 thereon which, as shown in FIG. 4, engages a latching bolt 76. Latching bolt 76 is anchored with a hinge pin or bolt 77 to the front bracket 63. The bracket 73 also has a lever arm 78 extending therefrom and bolted thereto with the bolt 80 and also attached to the hinge pin 74. In addition, the bracket 63 has cross-plates 81 on the bottom and a front stop plate 82 on the top which abuts a front stop plate 83 attached to the tongue 61. The rear bracket 64 has a cross-plate 84 on the top thereof. The plates 81 and 84 assure that the tongue 61 stays within the brackets 63 and 64 and the brackets are limited in their extension by the stop plates 62 and 83. In operation, the tongue 65 and 61 can be latched together, as shown in FIG. 4, and the latching arm 78 can then be rotated, as shown in FIG. 5, to remove the latching arm 73 away from the latching bolt 76 to allow the telescoping tongue 65 to telescope relative to the trailer tongue 61 to allow the boat trailer to extend away from the towing vehicle until the stop plate 72 contacts the stop 62. The trailer can then be pulled forward until the plate 82 on the bracket 63 contacts the stop 83 and the latching arm 78 is thrown forward to swing the latching arm 73 around the latching bolt 76 to lock the tongue member 61 and 65 together for towing the trailer.

Figure 6:
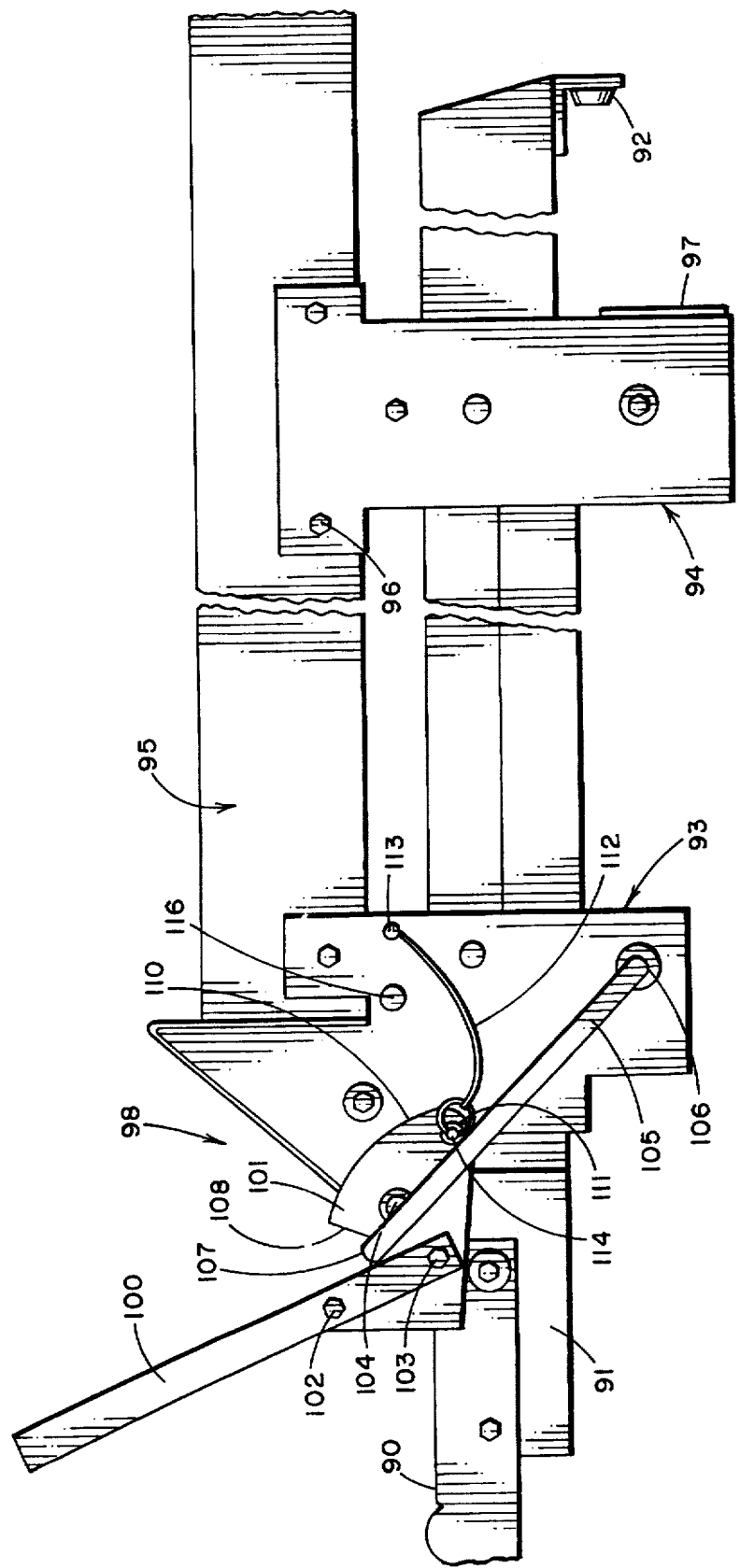
FIG. 6 is a side elevation of another embodiment of a latching mechanism in a latched position.
Figure 7:
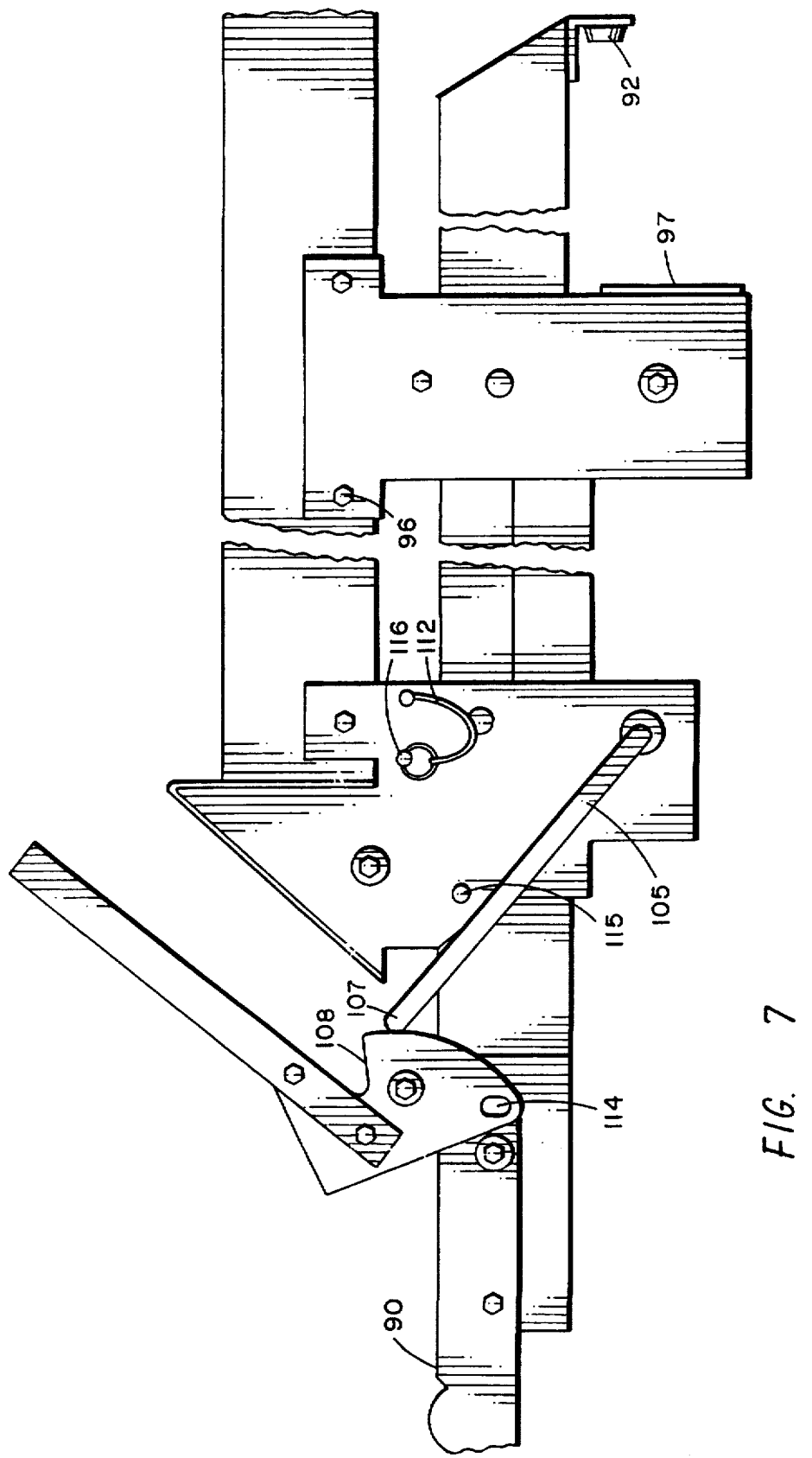
FIG. 7 is a side elevation of the embodiment of FIG. 5 in an unlatched position.

Referring now to FIGS. 6 and 7, another embodiment of a boat trailer telescoping tongue is illustrated having a trailer hitch attaching portion 90 attached to a trailer tongue 91. The tongue 91 has a stop 92 attached thereto and a front telescoping tongue bracket 93 and a rear telescoping tongue bracket 94. The brackets 93 and 94 each fixedly attach to the telescoping tongue 95 with bolts 96 and may be welded or attached in any manner desired. The front and rear tongue brackets 93 and 94 may have rollers supported thereinside riding on the top and bottom surface of the tongue 91, as shown in FIGS. 1–5. The rear bracket 94 has a stop surface 97 attached thereto for abutting the stop member 92 to limit the travel to prevent the tongue 95 from coming loose from the tongue 91. In its most forward position, the tongue 95 is locked to the tongue 91 with the latching mechanism 98 having the latching arm 100 which is attached to a latching arm 101 with the bolts 102,103 for rotating the arm 101 on a central pin 104. A locking link 105 is rotatably pinned in a sleeve 106 and has a U-shaped end member 107.

The latching arm 105 is illustrated in FIG. 6 latched with a curved locking portion 108 which is connected by sliding the arm 100 forward, as shown in FIG. 7, which allows it to slide on the arcuate surface 110 until it is captured by the locking surface 108. The handle 100 is then drawn forward to pull the locking arm 105 into a locked position, as shown in FIG. 6. A locking pin 111 may be supported on a small chain 112 and pinned with a pin 113 to the bracket 98. When the pin 111 is inserted in the opening 114, it locks the locking arm 110 to the bracket 93.

The latching mechanism 98 is released, as shown in FIG. 7, by removing the safety pin 111 from the opening 114 and 115 in the bracket 93 and placing it in the opening 116 for support. The handle 100 is then pulled forward which allows the arm 105 U-shaped portion 107 to slide off the latching surface 108, as shown in FIG. 7, so that the boat trailer tongue 95 can slide relatively to the boat tongue 91 to any desired position until the stop 97 on the bracket 94 abuts the stop member 92. Reversing the tongue 95 and moving it forward relative to tongue 91 until it reaches the latching position in FIG. 6 allows the latching handle 100 to pull forward to again lock the tongues 95 and 91 together in a towing position.

It should be clear at this time that a boat trailer having an extending or telescoping tongue has been provided which can be easily adapted for a wide variety of boat or other trailers. However, the present invention should not be construed as limited to the forms shown which are to be considered illustrative rather than restrictive.

I claim:

1. A boat trailer having an extending tongue comprising:

a boat trailer body;

a tongue having a pair of ends and a hitch attaching portion on one end thereof for removably attaching said tongue to a vehicle;

a telescoping tongue fixedly attached to said boat trailer body;

front and rear roller brackets attached to said telescoping tongue, each being movably attached to said tongue for rolling engagement therewith;

a latching mechanism attached to said tongue for removably locking said tongue to one said bracket of said telescoping tongue to thereby latch said tongue to said telescoping tongue to thereby prevent said telescoping tongue and trailer body from moving relative to said tongue when in a latched position and to allow said telescoping tongue and trailer body to telescope relative to said tongue when said latching mechanism is unlatched from said roller bracket; and said latching mechanism having a latching arm having a catch for engaging a locking dog on said front bracket and having a release arm coupled to said latching arm to release said latch arm from said dog to thereby let said telescoping tongue telescope relative to said tongue.

2. A boat trailer having an extending tongue in accordance with claim 1 in which said latching arm has an angled end portion to slide over said locking dog when engaging said dog.

3. A boat trailer having an extending tongue in accordance with claim 2 in which said front roller bracket has a roller positioned to ride on the top of said tongue and said rear roller bracket has a roller positioned to ride on the bottom of said tongue.

4. A boat trailer having an extending tongue in accordance with claim 3 in which said latching mechanism has a wedging surface positioned to engage said roller on said front roller bracket.

5. A boat trailer having an extending tongue in accordance with claim 4 in which said tongue has stop member thereon positioned to stop said telescoping tongue at a predetermined position.

6. A boat trailer having an extending tongue in accordance with claim 5 in which said front and rear roller brackets are connected with a hollow tube extending over said tongue to slide thereon.

* * * * *